United States Patent
Potonniee et al.

(10) Patent No.: US 7,387,258 B2
(45) Date of Patent: Jun. 17, 2008

(54) APPLICATION DEPLOYMENT FROM A SMART CARD

(75) Inventors: Olivier Potonniee, Marseilles (FR); Marie-Claude Pellegrini, Chassy (FR)

(73) Assignee: Gemplus, Gemenos (FR)

( * ) Notice: Subject to any disclaimer, the term of this patent is extended or adjusted under 35 U.S.C. 154(b) by 126 days.

(21) Appl. No.: 10/477,948

(22) PCT Filed: May 15, 2002

(86) PCT No.: PCT/FR02/01635

§ 371 (c)(1),
(2), (4) Date: Apr. 13, 2004

(87) PCT Pub. No.: WO02/095697

PCT Pub. Date: Nov. 28, 2002

(65) Prior Publication Data

US 2004/0178261 A1    Sep. 16, 2004

(30) Foreign Application Priority Data

May 18, 2001 (FR) .................................. 01 06606

(51) Int. Cl.
*G06K 19/06* (2006.01)
(52) U.S. Cl. ........................................ 235/492; 235/487
(58) Field of Classification Search .................. 235/492, 235/487
See application file for complete search history.

(56) References Cited

U.S. PATENT DOCUMENTS

| 5,212,369 | A | 5/1993 | Karlisch et al. |
| 5,659,735 | A | 8/1997 | Parrish et al. |
| 6,604,157 | B1 * | 8/2003 | Brusky et al. .................. 710/65 |
| 6,678,888 | B1 * | 1/2004 | Sakanishi ................... 717/172 |
| 6,769,620 | B2 | 8/2004 | Devaux et al. |

FOREIGN PATENT DOCUMENTS

| JP | 05-020085 | 1/1993 |
| JP | 05-054205 | 3/1993 |
| JP | 10-171662 | 6/1998 |
| JP | 10-240538 | 9/1998 |
| JP | 11-282686 | 10/1999 |
| JP | 2000-010786 | 1/2000 |
| JP | 2001-075813 | 3/2001 |

* cited by examiner

*Primary Examiner*—Lisa Caputo
(74) *Attorney, Agent, or Firm*—Buchanan Ingersoll & Rooney PC (57) ABSTRACT

The invention concerns a method for deploying an application consisting of several distributed remote elements, from a first data processing means containing descriptors of said elements, onto a second data processing means connected to the means for implanting said element, and for executing the deployed application. Said method comprises at least steps which consist in: selecting (2) at least one element of the application as priority element; deploying (3) onto the second processing means the priority elements or elements; and executing (5) the application with the second processing means when the priority element or elements have been deployed.

28 Claims, 2 Drawing Sheets

APPLICATION DEPLOYMENT FROM A SMART CARD

This disclosure is based upon French Application No. 01/06606, filed May 18, 2001, and International Application No. PCT/FR02/01635, filed on May 15, 2002, the contents of which are incorporated herein by reference.

BACKGROUND OF THE INVENTION

The present invention concerns the deployment of an application from a first data processing means, such as a smart card, also referred to as a microcontroller card or an integrated circuit card, onto a second data processing means, such as a reception terminal for the smart card, in a wide-ranging and heterogeneous context. In this context, the application consists of software components dispersed in a telecommunication network and must be able to be executed from heterogeneous terminals having different hardware and software characteristics, such as a mobile radiotelephone terminal, a personal digital assistant and a personal computer. The heterogeneous terminals differ for example by their operating systems and their data coding and communication characteristics.

At present, users access various applications through telecommunication networks, in particular the Internet, almost using any terminal whatsoever amongst various heterogeneous terminals, from their offices, their homes, or public access terminals. Unfortunately, the applications are not capable of configuring themselves automatically according to characteristics personal to the user and it is necessary to reconfigure the terminal of the user according to the application chosen. In order to execute the applications correctly, the terminal must have service data available relating to the application to be executed and to the remote servers offering these applications, and confidential personal data, specific to each user and personalizing the access to one or more applications. When the users are sedentary, this information is generally static on their terminals. On the other hand, when the users are itinerant, the smart card offers an autonomous, secure and portable medium for supplying these data to the terminals the user is liable to need.

Furthermore, it is in the interest of application providers for their applications to be usable from a very large number of terminal types. An application must therefore be capable of adapting itself to the terminal in which it is executed. For example, a given application presents a complex window-based graphical interface in a personal computer, and simple textual menus in a mobile radiotelephone, or establishes audio or video communication according to the transmission speed offered by the network and the terminal.

The adaptability of distributed applications to their execution context and to the requirements of the user thus becomes a necessity (cf. the article entitled "Adaptability of applications for mobile users", Michel Riveill et al., OCM'2000, Objets Composants Modéles, 8 May 2000). It is therefore necessary to deploy service applications according to the type of terminal and configuration personalisation for the user. This required flexibility is obtained through a modular architecture of each application. Each application is designed as a graph of components interconnected by connections. Deployment of the application onto a terminal creates therein instances of these components according to the personal characteristics and execution context.

Figure 1:
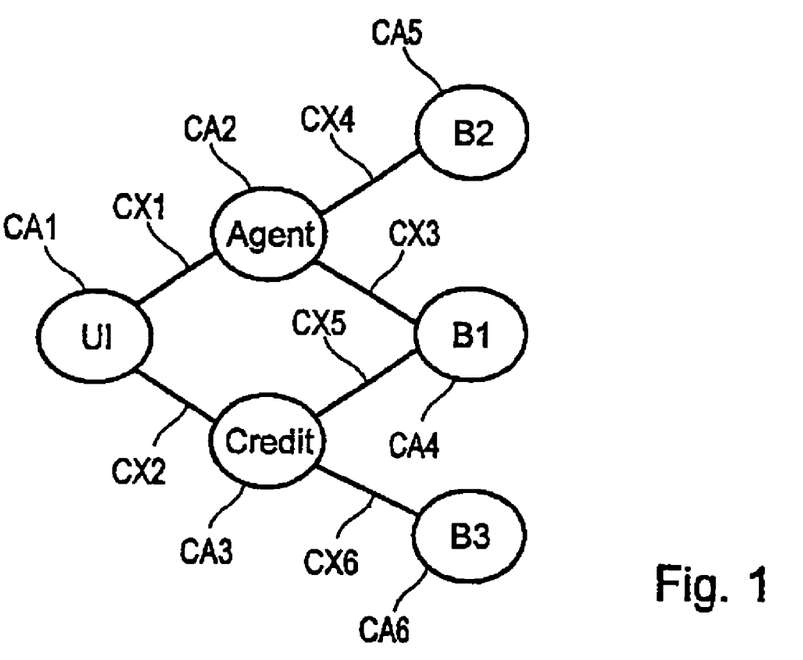
FIG. 1 depicts schematically a modular application comprising six components.
Figure 2:
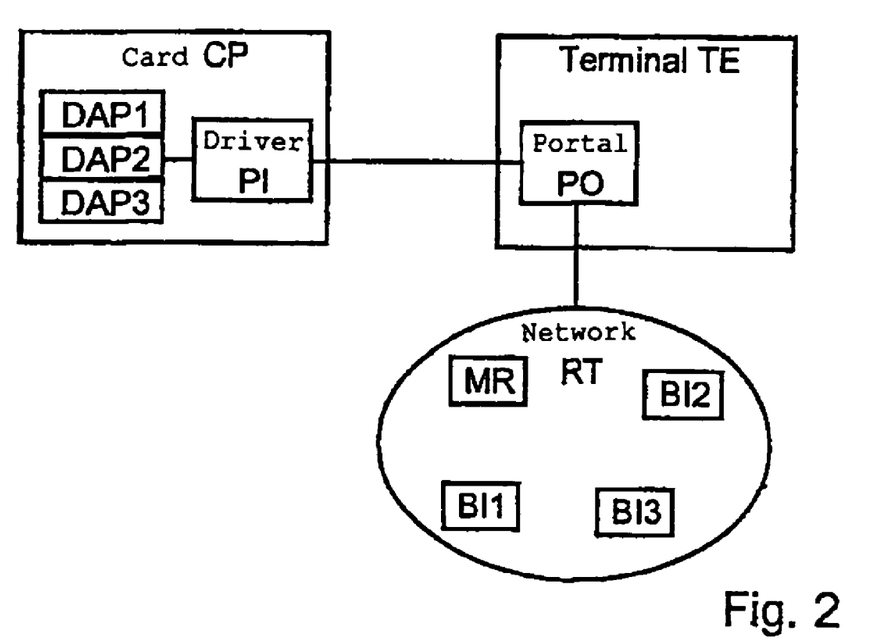
FIG. 2 is a schematic block diagram of the means used in a telecommunication network for the deployment of an application consisting of distributed remote elements.

As shown in FIGS. 1 and 2, definition of an application is known in a smart card CP, or any other portable electronic object having a relatively small memory capacity, by a descriptor DAP of an application AP identifying essential elements of the application such as the software components CA of the application and connections CX between these components in pairs. In general, an application comprises at least three components CA1, CA2 and CA3 and at least two connections CX1 and CX2 interconnecting the components CA1 to CA3 in pairs.

A component CA is a software processing unit encapsulating functionalities, small enough so that it can be created and maintained, and large enough so that it can be installed and supported. The component is provided with communication interfaces so that it can cooperate with other components and thus present its behavior to these other components. In practice, a software component can be physically located on any site whatsoever of a transmission network RT.

A connection defines the relationships between the communication interfaces of two components. Parameters of the connections of the application are also adapted to the context of the execution platform.

At the level of the smart card CP, an application descriptor DAP does not contain the element itself (software component CA or connection CX), but a descriptor DCA, DCX of the element CA, CX containing properties and parameters of the element defining it and making it possible to retrieve it from amongst a multitude of elements.

The properties of an element descriptor are fixed once and for all by the application provider who specialises the element, component or connection, in order to satisfy the requirements of the application and the user according to subscription characteristics for example. They indicate the characteristics of the platform on which the element can be executed, and the systems requirements necessary for its execution. One property can consist of an element address or type, which is associated with each element and used for searching for the code or the physical location of the element, or is intimately linked to the application or an application type. For example, the "account number" property is associated with a bank account manager component. These properties are, according to the prior art, fixed at the time of subscription to the service corresponding to the application by the user of the smart card, and are accessible for reading only.

Other properties, referred to as parameters, are preferably personalised by the user and can be modified at any time. For example, one parameter defines the currency for displaying an amount, or else a range of colours for displaying pages on a screen, or else again the value of the transmission speed or a transmission characteristic in a connection.

Each application descriptor is represented in the form of an object graph in an object-oriented language, for example JAVA (registered trademark) or XML (Extensible Markup Language).

The application descriptors DAP1, DAP2, DAP3 in a multi-application smart card are associated with the deployment driver (bootstrap) PI which constitutes within the smart card CP an application making it possible to select an application, configure it and deploy it according to its descriptor, after insertion of the card CP into the reception terminal TE. By gathering together the application descriptors and the deployment driver in the card, the confidentiality of the descriptors is ensured, with the result that the reading of the descriptors by the deployment driver does not require authentication. On the other hand, the deployment driver authenticates each client that interrogates it before making available to it all the application descriptors stored in the card. The driver PI can thus process one or more application deployments.

As already said, an application element, component or connection, is configured according to the application context, that is to say the hardware and software properties of the platform where the application will be executed, and parameters chosen by the user and personalizing the application. All this information is gathered together in the application element descriptor in order that the deployment driver PI filters the information contained in the element descriptor according to the application context and the personalisation parameters of the user.

The deployment driver PI located in the smart card CP transmits deployment commands to a deployment portal PO which is an application element implemented in the reception terminal TE. The main function of the portal is to receive the deployment commands and retransmit them to the execution platform in order to install the selected application. Thus the deployment portal principally has a function of informing the smart card about the environment in which the installation and execution of the selected application must be carried out, and a function of communicating with the card in order to receive various deployment commands for the selected application.

According to the prior art, the deployment of an application is synchronous, that is to say the commands produced by the deployment driver PI are transmitted sequentially, one after another, respectively for installing the elements of the application, then for parameterising the elements of the application, each command having to be acknowledged by the deployment portal PO on the terminal before the next command is sent by the driver PI.

Finally, when all the components and connections of the selected application AP are installed and parameterised, the application thus deployed is adapted to the terminal TE and can then be executed. The application is started by an execution command (RUN) which contains the name of the component of the selected application determining the entry point of the application, generally a user interface component.

It turns out that such a synchronous deployment has the drawback of making the installation of an application long, because of the succession of commands that must be acknowledged according to a predetermined scheme. This installation becomes longer as the number of components to be installed increases and the installation of said components necessitates calling upon the resources of the transmission network RT. This time during which the user is waiting can be a factor for rejecting an application when it is too great.

To attempt to remedy this drawback, a proposal has been made to perform the deployment of an application asynchronously, that is to say the driver PI requests the installation in parallel of all the application components which are independent of other components, without waiting for an acknowledgement from the portal PO, and then orders in parallel the installation of dependent elements in response respectively to acknowledgement of the installation of the elements on which they depend. Parameterising of the elements can also be performed asynchronously. In the case of a single-processor system, the execution in parallel of a number of processes means simply that a number of processes can be in the course of execution simultaneously, the resources of the processor being, of course, allocated to a single process at a given instant.

This solution makes it possible to optimise the use of the processing power and transmission speed offered by the terminal and transmission network. However, in particular when the application to be installed comprises many components and the deployment terminal has a small processing capacity, asynchronous deployment does not make it possible to significantly reduce the waiting time of the user before the application is started.

In the two preceding cases, all the application components are installed, even those that the user rarely or never uses, which unnecessarily increases the application installation time and unnecessarily overloads the resources of the terminal.

SUMMARY OF THE INVENTION

The objective of the present invention is to remedy the aforementioned drawbacks of the deployment of applications with distributed elements according to the prior art, and to further reduce the installation time.

This objective is achieved by the provision of a method for deploying an application consisting of a number of distributed remote elements, from a first data processing means containing descriptors of the said elements, onto a second data processing means linked to means of physically locating the elements, in order to execute the application once deployed, characterised in that it comprises at least the steps consisting of:

selecting at least one element of the application as a priority element;

deploying onto the second processing means the priority element or elements; and executing the application by the second processing means as soon as the priority element or elements have been deployed.

By virtue of these provisions, the waiting time of the user is considerably reduced, since the deployment performed before starting the application concerns a reduced number of components. In addition, if only the components used are installed, the card does not present the terminal with the descriptors of the non-installed elements, and the terminal resources are not overloaded by unnecessary elements.

Advantageously, the step of selecting at least one element of the application as a priority element consists of examining at least one priority indicator contained in the descriptor of the said application.

According to one particular feature of the invention, if, during execution of the application by the second data processing means, a non-deployed element is called, the method also comprises a step of deploying the called element, and then a step of continuing execution of the application.

According to another particular feature of the invention, the application elements not selected as priority elements are deployed onto the second data processing means in parallel with the execution of the application.

According to yet another particular feature of the invention, the method also comprises a step of transmitting the execution context of the application from the second data processing means to the first data processing means, the deployment in parallel with the execution of the application, of the application elements not selected as priority elements, being carried out according to the execution context transmitted.

Preferably, the application elements not selected as priority elements are deployed onto the second processing means in parallel with the execution of the application, synchronously.

Alternatively, the application elements not selected as priority elements are deployed onto the second processing means in parallel with the execution of the application, asynchronously.

According to yet another particular feature of the invention, the method also comprises a step of selecting at least one element of the application as a non-priority element, the non-priority elements of the application being deployed onto the second processing means only if they are called during execution of the application.

Advantageously, at the end of execution of the application, the method according to the invention also comprises a step of updating the respective priority indicators of the elements of the application according to the elements that have been used during execution of the application.

The invention also concerns an electronic object comprising a description means for describing an application consisting of a number of distributed remote elements, and a processing means for deploying the application with a view to its execution outside the electronic object, according to the application description means, characterised in that the description means comprises at least one priority indicator for selecting at least one element as a priority element of the application, and in that the means for deploying the application deploys only the priority elements before permitting the execution of the application.

This object is for example of the microcontroller card type.

The invention also concerns an application deployment system comprising a portable electronic object of the microcontroller card type, a terminal connected to a data transmission network and comprising a means for communicating with the portable electronic object, the portable electronic object comprising a description means for describing an application consisting of a number of distributed remote elements accessible to the terminal through the data transmission network, and a processing means for deploying the application onto the terminal with a view to its execution by the terminal, according to the application description means, characterised in that the description means comprises at least one priority indicator for selecting at least one element as a priority element of the application, and in that the means for deploying the application deploys only the priority elements before initiating the execution of the application deployed on the terminal.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION

FIG. 1 depicts an application of banking services accessible by a data transmission network such as the Internet. This application comprises a main component CA1 in which there are assembled all the functions UI for interfacing with the user; this component makes it possible to access a generic bank account management service integrated in a component CA2 and a generic credit request service CA3. To that end, the component CA1 is linked to the components CA2 and CA3 by the respective connections CX1 and CX2. In the particular application made available to the user, depicted in FIG. 1, the bank account management component CA2 is linked by the connections CX3 and CX4 respectively to the servers of two banking organisations B1 and B2 integrated in the components CA4 and CA5, which means that the user can access bank accounts managed only by the banking organisations B1 and B2. Similarly, the component CA3 is linked by the connections CX5 and CX6 respectively to the servers of two banking organisations B1 and B3.

All the elements of such an application do not necessarily have to be installed on the execution terminal of the application. Thus, in the example set out, the services offered by the banking organisation servers, in the course of execution on remote sites, are interrogated on demand by the execution terminal of the application. To that end, the link between the components CA2 and CA3 on the one hand and the components CA4 to CA6 on the other hand is made by the connectors CX3 to CX6 which use the network by implementing an appropriate communication protocol.

Such an application can be described by an application descriptor having the following form, expressed in the XML language:

```
<Application Name="Banking">
    <Component                                      Name="ui"
Type="banking.AccountServiceUIObject"
        Runnable="y">
        <Property Name="deploymentUrgency">
            <Value Value="100"/>
        </Property>
        ...
    </Component>
    <Component Name="B1" Type="banking.BankObject">
        <Property Name="deploymentUrgency">
            <Value Value="70"/>
        </Property>
        ...
    </Component>
    <Component Name="B2" Type="banking.BankObject">
        <Property Name="deploymentUrgency">
            <Value Value="50"/>
        </Property>
        ...
    </Component>
    <Component Name="B3" Type="banking.BankObject">
        <Property Name="deploymentUrgency">
            <Value Value="5"/>
        </Property>
        ...
    </Component>
    <Component                                   Name="Agent"
Type="banking.AccountServiceObject">
        <Property Name="deploymentUrgency">
            <Value Value="70"/>
        </Property>
        ...
    </Component>
    <Component                                   Name="Credit"
Type="banking.CreditServiceObject">
        <Property Name="deploymentUrgency">
            <Value Value="8"/>
        </Property>
        ...
    </Component>
    <Connection Name="Agent_B1"
            UserComponent="Agent"
    UserInterface="accounts"
            ProviderComponent="B1"
    ProviderInterface="accounts">
        <Property Name="deploymentUrgency">
            <Value Value="69"/>
        </Property>
        ...
    </Connection>
```

-continued

```
<Connection Name="Agent_B2"
        UserComponent="Agent"
UserInterface="accounts"
        ProviderComponent="B2"
ProviderInterface="accounts">
    <Property Name="deploymentUrgency">
        <Value Value="39"/>
    </Property>
    ...
</Connection>
<Connection Name="UI_Agent"
        UserComponent="ui" UserInterface="accounts"
        ProviderComponent="Agent"
ProviderInterface="accounts">
    <Property Name="deploymentUrgency">
        <Value Value="69"/>
    </Property>
    ...
</Connection>
<Connection Name="Credit_B1"
        UserComponent="Credit"
UserInterface="accounts"
        ProviderComponent="B1"
ProviderInterface="accounts">
    <Property Name="deploymentUrgency">
        <Value Value="2"/>
    </Property>
    ...
</Connection>
<Connection Name="Credit_B3"
        UserComponent="Credit"
UserInterface="accounts"
        ProviderComponent="B3"
ProviderInterface="accounts">
    <Property Name="deploymentUrgency">
        <Value Value="4"/>
    </Property>
    ...
</Connection>
</Application>
```

This syntax, using field start and end tags "<XXX>" and "</XXX>", represents a hierarchical structure of elements nested inside one another. It gives in particular a list of the descriptors of elements (software components and connections) forming part of the application, each element descriptor comprising in particular a list of properties.

As described above, such an application descriptor is stored in a first processing means such as a smart card CP, which can store a number of application descriptors DAP1, DAP2, DAP3, if it is a multi-application card. Such a card is intended to be read by a card reader coupled to a second processing means such as a terminal TE in which it is wished to deploy an application. The deployment of an application from such a card is managed by the deployment driver PI integrated in the smart card CP, which, when the card is read by the reader of a terminal TE, communicates with a software program referred to as a deployment portal PO provided on the terminal.

Deployment is therefore carried out by the deployment driver PI from the descriptor DAP of the selected application, by establishing a dialogue with the deployment portal PO in the reception terminal TE. The portal can contain an element search engine, or be in contact with one or more element search engines MR, as shown in FIG. 2. Each search engine MR has access to application element libraries BI1, BI2, BI3, through the transmission network RT. Each element in a library is stored with its descriptor and managed by the designer of the element. The transmission network RT can be a public or private network, of cabled or cell phone type, or else of computer network type such as the Internet.

Figure 3:
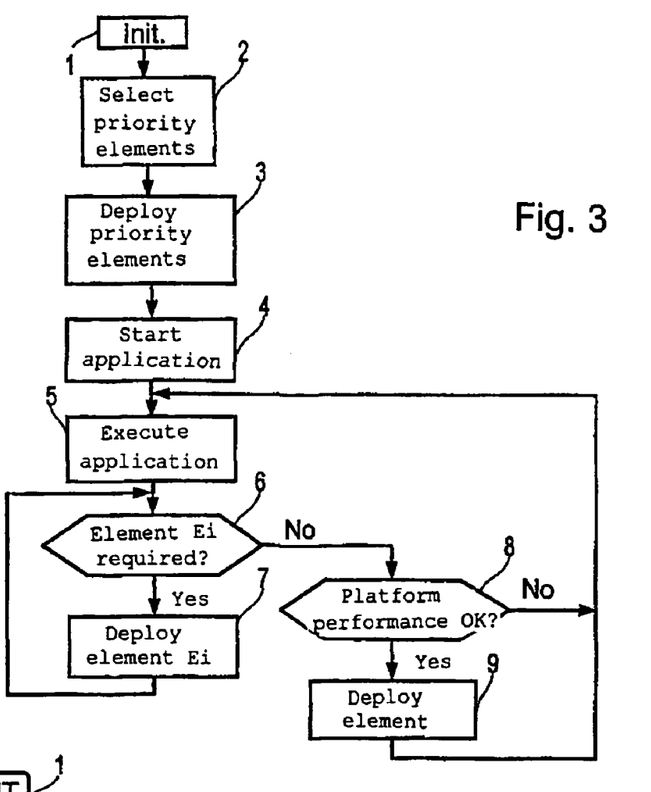
FIG. 3 is an algorithm for deployment and execution of an application, according to the invention.
Figure 4:
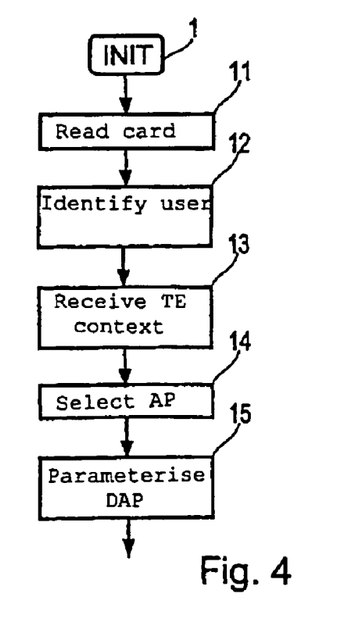
FIGS. 4 and 5 are algorithms showing in more detail certain steps of the algorithm depicted in FIG. 3.

As depicted in FIGS. 3 and 4, the deployment proper of a selected application is preceded by an initialisation phase 1 during which the user inserts the smart card CP into the reader slot of the reception terminal TE. After insertion of the smart card, the latter dialogues 11 with the reception terminal in order to authenticate 12 the user, ascertain 13 the context of the application execution platform constituted essentially by the terminal TE, and the selected application 14.

Authentication consists for example of verifying the identity of the user by means of a confidential PIN code entered through the terminal.

The context external to the hardware environment of the smart card is defined by properties of the execution platform which are transmitted by the terminal TE to the smart card CP. The properties of the execution context supplied by the terminal are for example the type of reception terminal TE used, the name of the terminal, an identification key or certificate of the terminal, and the geographical location of the terminal in the telecommunication network. These properties allow the deployment driver PI to limit the amount of data it transmits to the deployment portal PO and thus minimise the duration of the deployment. During a subsequent deployment, these references to the contextual properties are replaced by the values supplied by another reception terminal TE.

The user selects an application AP, conventionally for example from a menu presenting various applications whose deployments can be ordered by the smart card CP. After selection of the application AP, the terminal TE, according to context, and preferably the user parameterise 15 the application, that is to say parameterise certain of, or possibly all, the descriptors DCA and DCX of the components and connections of the selected application which are capable of being parameterised. Parameterisation by the user is conventional using tree-structured menus requesting parameter values.

Following these initialisation steps 1, the deployment of the selected application AP is carried out according to the component descriptors CAi and the connection descriptors CXi in the parameterised descriptor DAP of the selected application AP.

According to the invention, only certain elements of the application are defined as being priority elements and must be loaded before startup of the application, it being possible for the other elements to be deployed after startup of the application. In the example of FIG. 1, these elements are constituted by the user interface component CA1. In the application descriptor expressed in the XML language, presented above, the definition of the deployment priority of an element is defined in the form of a property associated with the element, called "deploymenturgency" and having a value situated between 0 and 100. By convention, it can be chosen that the value 100 is assigned to the priority elements, that is to say those having to be deployed before startup of the application.

The elements defined as priority elements are therefore selected 2 as being elements to be deployed, and then deployed 3.

After deployment of the priority elements, the application is started 4 and executed 5. In the example of FIG. 1, only the component CA1 that manages the dialogue with the user is deployed and activated. The result is that, after deployment of a single component, the user can detect on the terminal TE that the application is activated and offers him a choice between access to the bank account managers and access to credit offers.

Deployment of priority elements can take place synchronously or asynchronously. However, in general an application has a single entry point contained in a single component. Consequently, if it is wished for the application to be activated as quickly as possible, only the component containing the application entry point has to be configured as a priority element in order to be deployed on its own before startup of the application.

According to a first embodiment of the invention, deployments of non-priority application elements are performed only if they are requested by the user.

According to a second alternative embodiment of the invention, there is defined a category of medium priority elements which are deployed as a background task as soon as the application is started and a category of non-priority or low priority elements which are deployed only if they are required by the execution of the application in progress. In the application descriptor given above, it has been chosen as a convention that a priority level equal to 100 is assigned to the priority elements, a priority level above 10 and below 100 is assigned to the medium priority elements, and a priority level below 10 is assigned to the low priority elements, that is to say the elements which are rarely executed.

Advantageously, each time an element of an application is called during execution of the application, a message is transmitted to the smart card, in order to inform it thereof. For its part, the smart card, upon receiving such a message, updates the value field of the priority level in the descriptor of the element concerned in the application descriptor. In this way, the order in which the elements of an application are deployed can be adapted to the requirements and practices of each user concerning execution of an application.

When the user selects an option of the application in the course of execution, for example from a menu, either the component implementing the chosen function is already deployed and, in this case, it can be executed immediately, or it is not deployed. In the latter case, the execution environment of the application of the terminal TE detects that the component is not deployed and makes a request for deployment of the component to the smart card CP (step 6) by providing it for example with the name of the element to be deployed. This request initiates the deployment of the element (step 7). Here again, element deployment can be synchronous or asynchronous, that is to say the deployment driver PI waits or does not wait for the end of deployment before returning to step 6 in order to start another possible element deployment if other elements are required.

If there are medium priority elements to be deployed, these are deployed as a background task, also synchronously or asynchronously (step 9). Provision can be made that this deployment of medium priority elements is carried out only if the performance or capacities of the terminal are sufficient (step 8), or that these elements are deployed in order of priority until the available resources (for example in terms of memory capacity) of the terminal reach a predefined minimum threshold, or else, in the case of an asynchronous deployment, the number of deployments initiated in parallel is limited according to the available resources of the terminal, so as not to slow down, in a way appreciable to the user, the execution of the application in progress.

Figure 5:
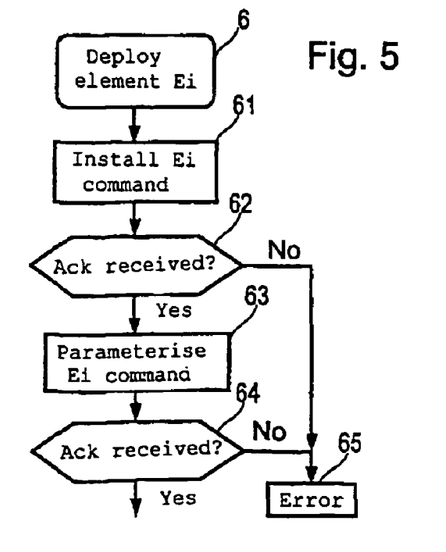

FIG. 5 illustrates the way in which the deployment 7 of an element Ei is performed. During such a deployment, four types of command are sent by the deployment driver PI to the deployment portal PO.

By means of a first installation command [INSTALL Ei] containing the properties of the element descriptor, the driver PI orders 61 the portal PO to install the component Ei of the selected application. In response to the installation command, the portal PO orders a search for the designated element Ei if it is a component, through at least one search engine MR, in a component library BI, so as to retrieve an instance of the component into the terminal TE, or a remote reference of this component. After complete execution of the installation command, installation of the element is confirmed 62 by an acknowledgement message [ACK(INSTALL Ei)] transmitted by the portal PO to the driver PI. The driver PI next sends 63 to the portal PO a second command [PARAMETERISE Ei], containing the configuration parameters for the element Ei, in order to parameterise the installed element. Parameterisation of the element Ei is performed according to certain parameters contained in the element descriptor and depends on the execution context of the application and possibly selections of the user, defined during deployment. Once parameterisation of the element has been performed by the portal PO, the latter transmits 64 to the driver PI an acknowledgment message [ACK(PARAMETERISE Ei)]. If, at steps 62 and 64, the portal PO has not responded by an acknowledgement before the end of a predetermined time delay, an error message is transmitted 65 by the driver PI to the terminal TE in order to signal that it has not been possible to perform the deployment of the element.

Where a number of elements are deployed asynchronously, they must of course be independent of one another, bearing in mind that an element dependent on other elements cannot be deployed as long as the elements on which it depends are not deployed on the terminal.

In the example of FIG. 1 and according to the corresponding application descriptor given above, only the user interface component CA1 is a priority element (priority equal to 100) and is deployed before execution of the application on the terminal. Next, as a background task or because the user has requested it, the banking agent component CA2 which has the highest medium priority (70) is installed, as well as the component CA4 which has the same priority. The deployment of these two components can be performed asynchronously, that is to say substantially in parallel, these two elements being independent of one another and not dependent on other elements. The deployment of the component CA5 can also be started since it is independent of the other application elements, even though it has a priority level of 50, lower than that of other elements not yet deployed like the connections CX1 and CX3. However, this deployment might not be performed if for example it is conditioned by the performance of the terminal. Next, once the components CA2 and CA4 are deployed, the connections CX1 between the user interface CA1 and the agent CA2, and CX3 between the agent and the bank server B1, which have the next highest medium priority 69, can be deployed in parallel. The connection CX4 between the components CA2 and CA5 can be installed following the component CA5. The other elements, that is to say CA3, CA6 and CX6, having a priority lower than 10, are installed only if the user requests them.

According to a preferred variant of the invention, the elements used during execution of the application are marked and, at the end of execution of the application, the terminal TE transmits to the smart card the reference of the elements thus marked. Following this transmission, the smart card updates the priority indicators of all the application elements according to the elements that have thus been used. The priority indicators of the application elements can thus be modified within certain limits. For example, the priority indicators of used elements are increased, whilst unused elements are decreased.

The invention claimed is:

1. A method for deploying an application comprised of a number of distributed remote elements, said deploying being initiated from a first data processing means containing a number of descriptors corresponding to respective ones of said elements deployable onto a second data processing means, said descriptors including priority values indicative of a deployment priority of the corresponding elements, and said second data processing means being linked to means for physically locating the elements and executing the application once deployed, the method comprising the following steps:
identifying one or more elements of the application having a priority value not less than a predetermined urgency value as priority elements, said priority elements having a higher deployment priority than other elements of the application;

deploying the identified priority elements onto the second processing means;

executing the application by the second processing means as soon as the priority elements have been deployed; and deploying the other elements of the application onto the second processing means after initiating execution of the application based on the priority values corresponding to the other elements.

2. A method according to claim 1, wherein the step of identifying one or more elements of the application as priority elements comprises:
examining at least one priority indicator contained in a descriptor of said application.

3. A method according to claim 2, further including the step of:
at the end of execution of the application, updating the respective priority indicators of the elements of the application according to the elements that were used during execution of the application.

4. A method according to claim 1, further including the steps of,
during execution of the application by the second data processing means, deploying a called element that has not been previously deployed, and
then continuing execution of the application.

5. A method according to claim 1, wherein the application elements not identified as priority elements are deployed onto the second data processing means in parallel with the execution of the application.

6. A method according to claim 5, further including the steps of:
transmitting an execution context of the application from the second data processing means to the first data processing means; and
deploying the application elements not identified as priority elements in parallel with the execution of the application according to the execution context that was transmitted.

7. A method according to claim 5, wherein the non-priority elements are synchronously deployed onto the second processing means in parallel with the execution of the application.

8. A method according to claim 5, wherein the non-priority elements are asynchronously deployed onto the second processing means in parallel with the execution of the application.

9. A method according to claim 1, further comprising the step of:
deploying the non-priority elements of the application onto the second processing means only if they are called during execution of the application.

10. An electronic object comprising:
a description means for describing an application having a number of distributed remote elements; and
a processing means for deploying the application for execution outside the electronic object, according to the application description means, wherein:
the description means comprises at least one priority indicator indicative of a deployment priority of a corresponding one of said elements, said priority indicator identifying at least one of the elements as a priority element of the application having a higher deployment priority than other elements of the application;
the means for deploying the application deploys only the priority elements before execution of the application is initiated, the deployed priority elements having a priority value not less than a predetermined urgency value; and
the means for deploying the application deploys one or more of the other elements after initiating execution of the application based on the priority values corresponding to the other elements.

11. An electronic object according to claim 10, wherein said object is a microcontroller card.

12. An application deployment system comprising:
a portable electronic object in the form of a microcontroller card; and
a terminal connected to a data transmission network and having a means for communicating with the portable electronic object,
wherein the portable electronic object comprises:
a description means for describing an application having a number of distributed remote elements accessible to the terminal through the data transmission network, said description means including at least one priority indicator indicative of a deployment priority of a corresponding one of said elements and
a processing means for deploying the application onto the terminal for execution by the terminal, according to the description means, said processing means being adapted to:
identify one or more elements of the application having a priority value not less than a predetermined urgency value as priority elements, said priority elements having a higher deployment priority than other elements of the
deploy only the priority elements before initiating the execution of the application deployed on the terminal; and
deploy one or more of the other elements after initiating execution of the application based on the corresponding priority values of the other elements.

13. A method for deploying an application having a number of components, the method comprising:
classifying the components of the application into a first category of components that are to be loaded before startup of the application, and at least a second category of components that can be deployed after startup of the application, the components of said first category having a corresponding priority value not less than a predetermined urgency value;
in response to a request to run the application on a data processor, deploying the components of said first category from a remote source to said data processor;

executing said application on said data processor with the components of said first category prior to the time that components of said second category have been deployed to said data processor; and deploying the components of said second category to said data processor based on the corresponding priority values of the components in the second category.

14. The method of claim 13 further including the step of classifying the components of said second category into a first sub-category of components that can be deployed as a background task after the execution of the application has been initiated, and a second sub-category of tasks that are deployed only if called during the execution of the application.

15. The method of claim 14, further including the step of determining at least one attribute of said data processor during execution of the application, and automatically downloading a component of said first sub-category during execution of the application if said attribute exceeds a threshold value.

16. The method of claim 15, wherein said attribute comprises available memory capacity.

17. The method of claim 15, wherein said attribute comprises performance speed of the application execution.

18. The method of claim 13, further including the step of deploying a component of said second category to said data processor when a call is made for said component during execution of the application.

19. A method for installing and executing an application consisting of a plurality of distributed software components and connection elements that define connections between the software components, by means of a first data processing means, from a transmission network onto a second data processing means, said software components and connection elements being located on a site of the transmission network that is linked to the second data processing means, wherein the first data processing means stores, on a computer-readable medium, a descriptor for the application comprising identifications of software components and at least one connection element for combining the identified software components, and deployment commands that, when executed by the first data processing means, install and deploy the application onto the second data processing means according to the descriptor, said method including the following steps:

selecting at least one software component of the application having a corresponding priority indicator value in the descriptor that is not less than a predetermined urgency value, said at least one software component having a higher priority indicator value than at least one other component of the application;

installing and deploying onto the second data processing means only the selected components before startup of the application;

executing the application by the second data processing means after said selected components have been installed; and installing and deploying onto the second data processing means non-installed components of the application after startup of the application based on the priority indicator value corresponding to the non-installed components.

20. A method according to claim 19, wherein the step of selecting at least one software component of the application is performed by examining at least one priority indicator contained in the descriptor of said application.

21. A method according to claim 20, further comprising the step, at the end of execution of the application, of updating the respective priority indicators of the software components of the application according to how frequently the software components have been used during execution of the application.

22. A method according to claim 19, wherein if, during execution of the application by the second data processing means, a non-installed software component is called, the second data processing means installs the called software component, and then continues execution of the application.

23. A method according to claim 19, wherein the software components not selected as higher priority elements are installed onto the second data processing means concurrently with the execution of the application.

24. A method according to claim 23, wherein the execution of the application comprises the step of transmitting the execution procedure from the second data processing means to the first data processing means, and wherein the concurrent installation of the software components not selected as higher priority elements is carried out according to said execution procedure.

25. A method according to claim 19, wherein the software components not selected as higher priority elements are installed onto the second data processing means in synchronization with the execution of the application.

26. An electronic object comprising:
a first data processor; and
a computer-readable data storage device storing program instructions, and storing a descriptor for an application consisting of a plurality of distributed software components and connection elements defining connections between said software components, wherein said program instructions, when executed by the first data processor, control the electronic object to:

transmit deployment commands to a second data processing means for installing and deploying the application onto the second data processing means according to the descriptor, the descriptor comprising at least one priority indicator field identifying at least one software component as an element of the application having a higher priority than at least one other component of said application, wherein said first data processors:
selects one or more components of the application having a corresponding priority indicator field value that is not less than a predetermined urgency value as priority components;

installs and deploys, based on the value of the priority indicator field, only said higher priority elements onto the data processing means before startup of the application, and installs and deploys, based on value of the priority indicator field, one or more of the other components after startup of the application.

27. An electronic object according to claim 26, wherein the electronic object is a microcontroller card.

28. An application deployment system comprising:
a microcontroller card;
a terminal connected to a data transmission network; and
a means for communicating with the microcontroller card, said microcontroller card comprising:
a processor; and
a computer-readable data storage device storing program instructions, and storing a descriptor for an application consisting of a plurality of distributed software components and connection elements defining connections between said software components, said program instructions, when executed by the processor, controlling said processor to transmit deployment commands to a data processing means for installing and deploying the application onto the data processing means according to the descriptor, wherein the descriptor comprises at least one priority indicator field identifying at least one software component as an element of the application having a higher priority than at least one other component of said application, and wherein said processor:

selects one or more elements of the application identified as having a value in the corresponding priority indicator field that is not less than a predetermined urgency value as priority elements, installs and deploys, based on the priority indicator field, only said higher priority components onto the data processing means before startup of the application, and installs and deploys, based on the priority indicator field, said at least one or more other components onto the data processing means after startup of the application.

* * * * *